(12) United States Patent
Rouda, Jr.

(10) Patent No.: US 9,918,199 B2
(45) Date of Patent: Mar. 13, 2018

(54) SUBJECT MATTER BASED TOUR GUIDE

(71) Applicant: Harley E. Rouda, Jr., Laguna Beach, CA (US)

(72) Inventor: Harley E. Rouda, Jr., Laguna Beach, CA (US)

(*) Notice: Subject to any disclaimer, the term of this patent is extended or adjusted under 35 U.S.C. 154(b) by 0 days.

(21) Appl. No.: 14/192,296

(22) Filed: Feb. 27, 2014

(65) Prior Publication Data

US 2014/0248911 A1 Sep. 4, 2014

Related U.S. Application Data

(60) Provisional application No. 61/771,583, filed on Mar. 1, 2013.

(51) Int. Cl.
| | |
|---|---|
| *G01C 21/34* | (2006.01) |
| *G01C 21/36* | (2006.01) |
| *H04W 4/02* | (2018.01) |

(52) U.S. Cl.
CPC ........ *H04W 4/027* (2013.01); *G01C 21/3679* (2013.01); *H04W 4/021* (2013.01); *H04W 4/028* (2013.01)

(58) Field of Classification Search
CPC ............ G06F 17/30873; G01C 21/343; G01C 21/3476; G01C 21/3438; G01C 21/3644; G01C 21/3679; H04W 4/027; H04W 4/025; H04W 4/028; H04W 4/046
See application file for complete search history.

(56) References Cited

U.S. PATENT DOCUMENTS

| | | | | |
|---|---|---|---|---|
| 7,647,166 | B1* | 1/2010 | Kerns | .......... 701/412 |
| 9,143,881 | B2* | 9/2015 | Fan | ......... H04W 4/00 |
| 2002/0167442 | A1* | 11/2002 | Taylor | ..... G01C 21/36 |
| | | | | 342/357.64 |
| 2008/0072139 | A1* | 3/2008 | Salinas et al. | ........ 715/238 |
| 2010/0011391 | A1* | 1/2010 | Carpenter et al. | ........ 725/25 |
| 2011/0169647 | A1* | 7/2011 | Morley | ...... G08B 27/006 |
| | | | | 340/573.4 |
| 2012/0016577 | A1* | 1/2012 | Kim et al. | ......... 701/201 |
| 2013/0006522 | A1* | 1/2013 | Vellaikal | ...... H04W 4/023 |
| | | | | 701/426 |
| 2014/0136100 | A1* | 5/2014 | Drysdale | ............. 701/461 |

OTHER PUBLICATIONS

GPS Tour Guide Inc. "Gypsy Guide" Gypsyguide.com, 2014, 3 pages.

* cited by examiner

*Primary Examiner* — Christopher M Brandt
(74) *Attorney, Agent, or Firm* — Standley Law Group LLP; Jeffrey Standley; Beverly Marsh

(57) ABSTRACT

A method for communicating tour information to a user of a mobile electronic device is disclosed. The mobile device receives from a global positioning satellite (GPS) system geographic coordinates of the mobile device, compares them with coordinates stored in a database having associated with them a point-of-interest. Once coordinates of a point-of-interest are located and determined to be within a predetermined distance from the mobile device, the system will select from the plurality of tour data, a preprogrammed tour corresponding to that POI. The internet may be accessed through the device's wireless transceiver in order to download internet material associated with the point-of-interest. The tour and internet material information is then communicated to the user through a user interface.

20 Claims, 5 Drawing Sheets

SUBJECT MATTER BASED TOUR GUIDE

CROSS-REFERENCE TO RELATED APPLICATIONS

This application claims priority to provisional application 61/771,583 filed on Mar. 1, 2013 and is herein incorporated by reference in its entirety.

BACKGROUND OF THE ART

Location based wireless communication systems have been described to transmit information from a location based server to a mobile device. Such mobile devices are used in museums or other destination locations which provide automated guided tours. Tour information is transmitted to the mobile device via infrared, or other wireless communication means.

Attempts to provide location-based information have been made, for example, as disclosed in U.S. Pat. No. 7,826,966 to Little et al., referenced herein. There, a venue service computer located at or near a venue of a tour is described as communicating wirelessly, tour information to a mobile device. In this example, a venue service computer must be near a venue where points-of-interest are located. In other examples, information about a destination location, such as an airport, may be communicated to a mobile device when reaching a certain proximity to the location.

These examples describe a system where the user first determines the destination location they wish to visit. Location specific information is communicated to the user once they arrive at their desired location. Such systems have also relied on a computer server located at the destination location to communicate information to a user's mobile device. Such systems are vulnerable to wireless communication interference and also require the mobile device to be within a close proximity to the communicating computer server.

What is needed is a system that is not reliant on location based servers to wirelessly communicate location based information. It would be a significant improvement in the art to introduce a system that provides real-time tour information to travelers regardless of their destination which does not also require wireless communication from a location based server to transmit tour data.

SUMMARY OF THE INVENTION

Presented is a method for communicating tour information to travelers. Generally, for example, a traveler may include a user traveling across a country to a distant location. Other travelers may include users who may be traveling to cities and nearby destinations. The present invention is directed towards communicating tour information about nearby points-of-interest as the user is traveling towards their intended destination.

In exemplary embodiments of the invention, the invention may be used regardless of where the user is going and regardless of what route the user would take traveling to their destination. A user may be notified of points-of-interest that are along the route the user is traveling or also notified of points-of-interest that are off the traveler's route but within a predetermined distance from that route. In some embodiments of the invention, this predetermined distance may be variable depending upon the user's mode of transportation and characteristics of the point of interest.

The method comprises receiving by a mobile electronic device, location data from a global positioning satellite (GPS) system where such location data may be used to calculate the geographic coordinates of the mobile electronic device. A processor, under the control of software, may query the mobile electronic device's database to determine whether the position of the mobile electronic device is within a predetermined distance from geographic coordinates stored in the mobile electronic device's database that are associated with a known point-of-interest (POI). From a plurality of preprogrammed tour data, a preprogrammed tour, corresponding to the POI within the predetermined proximity to the mobile electronic device, may be selected. The tours selected may be selected based upon factors comprising characteristics of the user, the user's mode of transportation, and the user's speed. In embodiments of the invention, the user may be provided with the option to select from more than one tour.

In other embodiments of the invention, the mobile electronic device's wireless transceiver may be accessed to determine if there is an internet connection. If an internet connection exists, the internet may be queried for materials linked to the geographic coordinates having associated with it the known POI. In such an embodiment, the mobile electronic device may update or supplement information stored in its database using information retrieved from the internet or other database.

In yet another embodiment of the invention, a notification may be communicated to a user of the mobile electronic device, requesting input from the user to either accept or deny the communication of available tour data. Upon acceptance of the notification, tour data and internet material, if available, are then communicated to the user of the mobile electronic device through a user interface.

BRIEF DESCRIPTION OF THE DRAWINGS

A better understanding of the disclosed embodiments will be obtained from a reading of the following detailed description and the accompanying drawings wherein identical reference characters refer to identical parts and in which.

DETAILED DESCRIPTION OF A PREFERRED EMBODIMENT

A disclosed embodiment of the present invention enables a user of a global positioning satellite (GPS) enabled mobile electronic device or a mobile electronic device in communication with a GPS receiver to access information regarding points-of-interest while traveling. In general, the invention relates to a software system, implemented on a GPS enabled mobile electronic devices as further described below. A GPS enabled mobile electronic device is used to initiate preprogrammed notifications and tour communications based on a traveler's geographic location as he or she is traveling.

Figure 1:
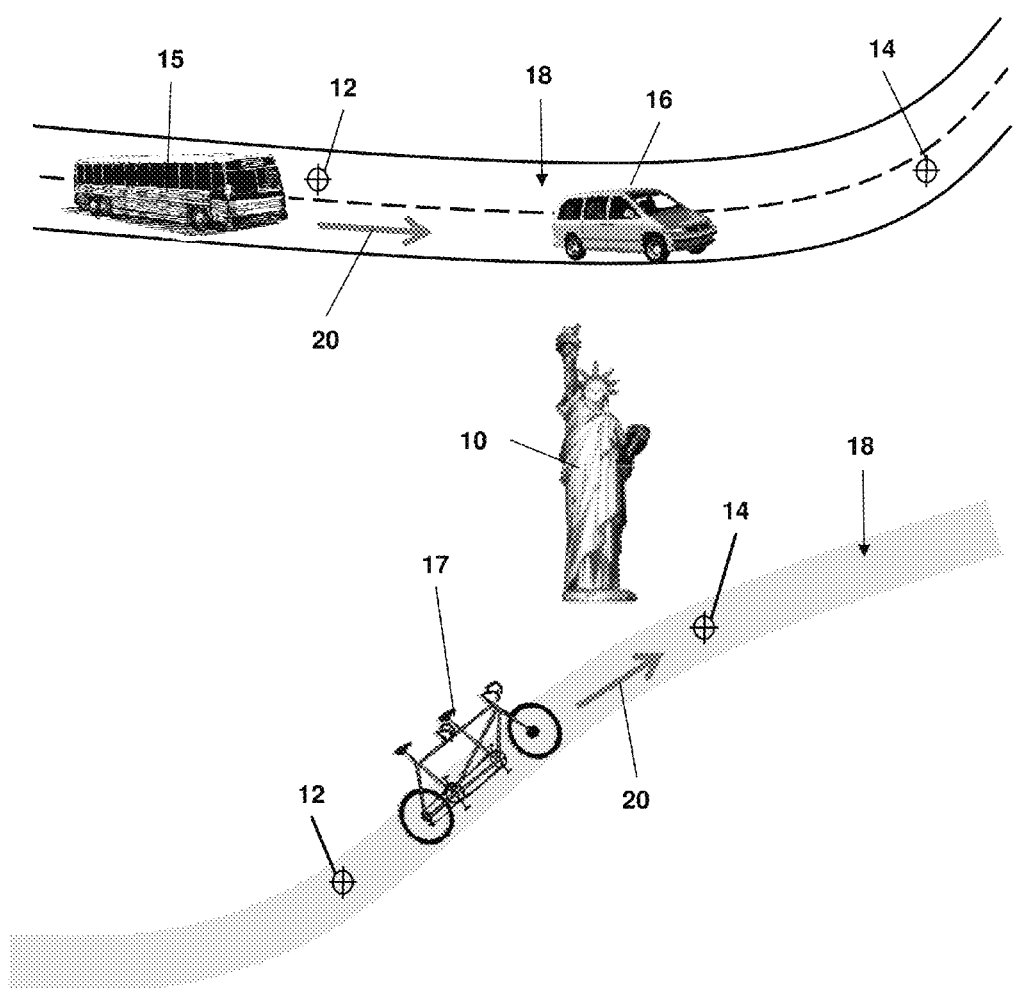
FIG. 1 is a diagram illustrating the method used in a vehicle.

Referring to FIG. 1, in an exemplary embodiment, a diagram illustrates an exemplary embodiment of a GPS enabled mobile electronic device (not shown) used in an automobile 16, on a bicycle 17, or a tour bus 15, to notify a user of the availability of and initiate a preprogrammed historical tour of a point-of-interest (POI) 10. As shown in FIG. 1, in an exemplary embodiment, geographic coordinates 12 and 14 of a roadway 18 passing the nearby POI 10, having historical or present day significance, may be mapped and stored in a database which may be located on a remote server, in the memory of a mobile electronic device, or removable memory which may be placed in communication with the mobile electronic device. In an exemplary embodiment of the invention, the GPS enabled mobile electronic device may be operated by a user traveling in an automobile 16. Upon a predetermined distance from geographic coordinates 12 or 14, or the POI 10, notification of an approaching point of interest 10 may be initiated.

In an exemplary embodiment of the invention, a notification may prompt a user to accept or deny an audio or video tour of the point of interest 10. If accepted, the mobile electronic device will initiate a preprogrammed tour of the POI 10. The audio or video tour may comprise a prerecorded audio or video recording, communicating the historical background of the POI. As further described herein, a user's geographic location and direction of travel may be received by the processor and result in the processor enabling audio communication directing a user's attention to a POI in relative to the user's direction of travel. For example, audio communications may include "ahead on your left," or "directly on your right." Other embodiments of the invention may use visual communication methods such as words or arrows or a combination of visual and audio communications methods.

In an exemplary embodiment, a tour presented to the user may be modified to optimize its length and content where such modification is determined by whether the user slows or stops on the roadway 18 or nearby to listen, or whether the user continues along the roadway 18, thereby passing and leaving the POI 10. In an exemplary embodiment, a user traveling at a normal roadway speed may be presented with an abbreviated tour or overview of the POI. Should the user be traveling at a slower speed or slow to such a speed after receiving such an abbreviated tour, an embodiment of the invention may present the user with additional tour options comprising longer or more detailed tours.

Figure 2:
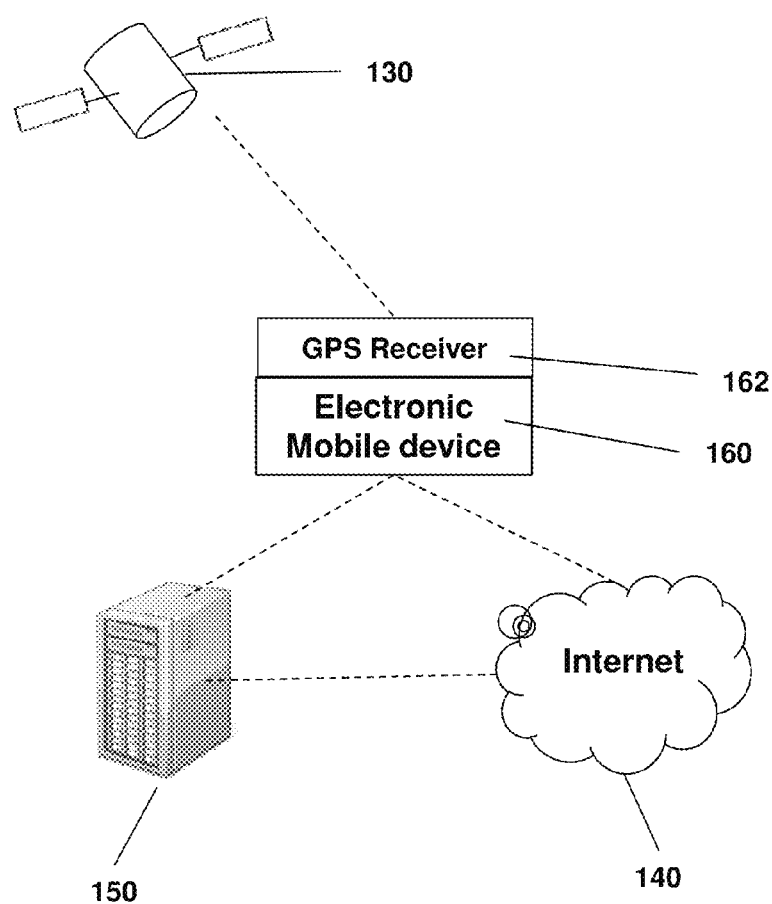
FIG. 2 is a block diagram illustrating a mobile electronic device in communication with a GPS satellite, a server, and the internet in an embodiment of the invention.

Internet access 162, as illustrated in FIG. 2 and described in more detail later herein, may enable the user of the GPS enabled mobile electronic device to access the internet and information relating to the POI associated with the geographic location 10 of the mobile electronic device. For example, the system may search for the geographic coordinates of the POI 10 associated with a Wikipedia® article. Upon finding a Wikipedia® article associated with the geographic coordinates of the POI 10, the user may be presented with the opportunity to review the Wikipedia® article and other associated information. As illustrated in FIG. 2, a GPS receiver 162 may be in communication with or embedded within the mobile electronic device.

The system may also employ restrictions to viewable content based on the characteristics of the user or whether the user is in motion or at a stop. If employed restrictions deny the user access to content related to a POI, the mobile electronic device may end the notifications related to that POI and cancel the preprogrammed tour communication.

In an exemplary embodiment of the invention, geographic coordinates of a road 18 may be identified as representing a direction of travel 20 on the road 18. For example, geographic coordinates 12 in the right lane of a road can be identified as representing one direction of travel on the road 18, while geographic coordinates 14 will be identified as representing a position having an opposition direction of travel. Each set of geographic coordinates 12, 14 having associate with it a direction of travel, will indicate to the mobile electronic device a direction of travel on the road 18. Reception of a direction of travel by the mobile electronic device's processor may initiate a POI notification to the user. For example, when used in a vehicle traveling on a roadway and reaching a predetermined distance from geographic location 12, the mobile electronic device may initiate a notification of the POI 10 as being located ahead on left of the roadway 18 traveled by the user in vehicle 16. Conversely, when approaching the geographic location 14 from the opposite direction, the mobile electronic device may initiate a notification of the POI 10 as being located ahead on the right of the roadway 18.

In another exemplary embodiment, the direction of travel of the user of the mobile electronic device may be determined by processing short sequential geographic positions of the mobile electronic device while in motion, calculating a vector thereof, thereby determining the direction of travel along a roadway 18. In another example, the direction of travel 20 may be determined by a geographic location along a roadway between two waypoints having starting and ending designations. And in yet another example, direction may be obtained from a mechanical or electronic compass integrated or in communication with the portable electronic device.

In another exemplary embodiment, the direction of travel and the velocity of the mobile electronic device as determined by the mobile electronic device's GPS system may be received by the mobile electronic device's processor, thereby modifying the point at which a user is notified of an upcoming POI. For example, a user traveling slowly may be notified a short distance before the user is expected to reach an upcoming POI, whereas a user traveling at a higher rate of speed may be notified at a much earlier point along the user's course as to give the user sufficient warning. The point at which a user receives such a notification may be preselected or adjustable and sufficient to allow the user the opportunity to evaluate his or her interest in the upcoming POI and react accordingly in a safe manner should there be an interest in the POI.

It is well understood, the direction of travel along a roadway is not limited by the methods presently disclosed and may be determined by other known methods in the art. In an exemplary embodiment, a mobile electronic device may be specifically adapted to communicate with or modify an existing GPS navigation system, well known in the art, to extract direction of travel, velocity, and other information.

As shown in the diagram of FIG. 2, a mobile electronic device may be configured such that it is able to communicate 162 with remote systems. As illustrated in FIG. 2, a mobile electronic device 160 may communicate with, for example, a GPS satellite 130, the internet 140, and a remote server 150. The remote server 150 may also have a connection 164 to the internet 140, allowing the server to access information associated with points-of-interest.

Figure 3:
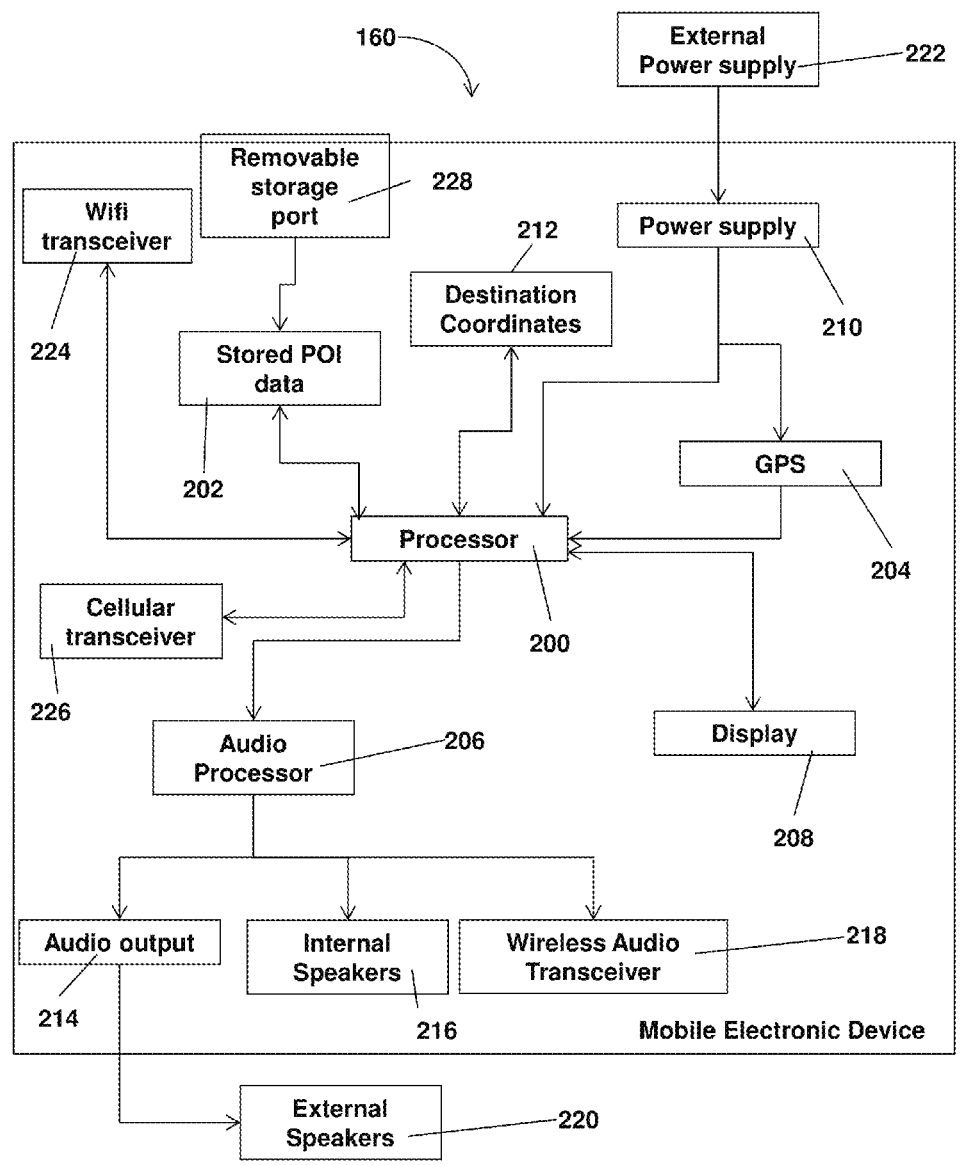
FIG. 3 is a block diagram of a mobile electronic device used in an embodiment of the invention.

Referring to FIG. 3, a diagram illustrates a mobile electronic device 160 according to certain embodiments of the invention. As shown in FIG. 3, in an exemplary embodiment, a GPS enabled mobile electronic device 160 comprises a processor 200 connected to memory comprising stored POI data 202, a GPS receiver 204, an audio processor 206, and a display 208. A power supply 210, such as a battery, may also be connected to the processor 200, and where applicable, to the GPS receiver 204, display 208, and audio processor 206. In an exemplary embodiment of the invention, the mobile electronic device may comprise a port for an external power supply 222 connected to the onboard power supply 210. The external power supply 222 may plug into a vehicle's power outlet, or may be directly hardwired into a vehicle's electrical system. In another example, when using an external power source, such as coming from a vehicle, the external power supply 222, may also power and recharge the on board power supply 210 of the mobile electronic device. The processor 200 may also communicate with memory 202 having stored destination coordinates 212 used to determine direction of travel along a roadway.

As shown in FIG. 3, an audio processor 206 in an exemplary embodiment may be connected to an audio output 214, internal speakers 216, or a wireless audio transceiver 218. In one example, the wireless audio transceiver 218 may link with and transmit a wireless audio signal to a vehicle's wireless audio receiver. The wireless audio signal may take the form of, but is not limited to, Bluetooth, radio frequency, or a wifi connection. The audio output 214 may also be connected to one or more external speakers 220.

In an exemplary embodiment, a wifi transceiver 224 and cellular transceiver 226 may be connected to the processor 220 enabling the mobile electronic device to communicate with a remote server 150 and the internet 140. A removable storage port 228 may be arranged in the mobile electronic device and connected to the processor to allow POI data saved on a removable storage device to be connected to the mobile electronic device 160. In an exemplary embodiment the described system may access stored POI data saved on storage media such as, but not limited to, flash memory devices.

Figure 4:
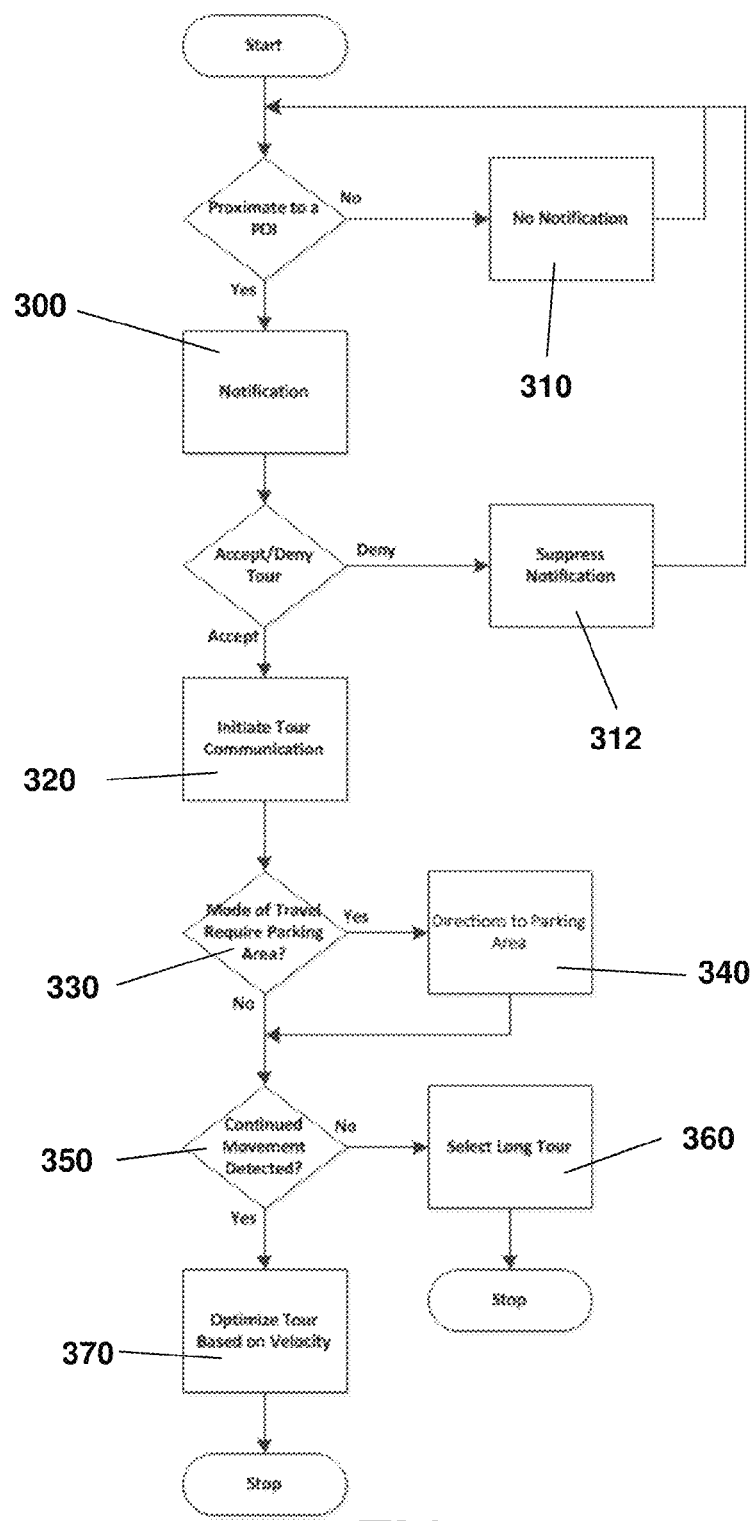
FIG. 4 is a flow chart illustrating steps performed in an embodiment of the invention.

Referring to FIG. 4, a diagram is shown illustrating a process of notifying and initiating a selected tour for a geographic position associated with a POI. In an exemplary embodiment illustrated in FIG. 4, a processor 200, upon receiving data representing a distance between the mobile electronic device and a POI that is within a distance satisfying a predetermined distance requirement between the geographic position of the mobile electronic device 160 and the position of POI 10 or geographic coordinates of 12 or 14 may initiate a preprogrammed notification 300 to the user. If the predetermined distance requirement is not satisfied, no notifications 310 will be communicated. Upon communication of the notification 300, a user may be presented will the option to accept or deny tour information. If denied, the option to accept or deny tour information may be suppressed 312. If accepted, the system may initiate tour communication 320.

In an exemplary embodiment, the invention, upon acceptance and initiation of the tour communication 320, may communicate or cause a separate GPS enabled device to communicate directions to available parking areas, if applicable depending on a user's selected mode of travel 330. For example, where the user is driving, upon notification of a POI up ahead and acceptance of a tour, the system may communicate suggested driving directions 340 to a parking area where a user may park and listen or view a tour with more attention, as not to distract from driving. The system may also monitor a user's geographic location in real-time, allowing it to detect a user's movement 350 and subsequently select and communicate at least one of a plurality of preprogrammed tours available that are optimized to the user and his or her characteristics. In one example, where the user in a vehicle stops, the system may select from a plurality of preprogrammed tours, communicating at least one that is longer, more detailed, and includes video 360. In an exemplary embodiment, in recognizing the user's velocity of travel, the system may select multiple preprogrammed tours, communicated in series to the user, as that user travels by a POI. In determining the velocity of the user's movement, an embodiment of the invention may, in real-time, adapt the tour information selected in order to better optimize 370 the tour based on area of the POI and the time estimated to be available before the user will depart from the area of the POI. For example, if a user is traveling by car along a road at 65 mph, a preprogrammed tour, or a series of preprogrammed tours, may be communicated to the user as that user approaches, reaches, and departs from the area of the POI, during a period of 1 or 2 minutes. However, in another exemplary embodiment, a user who is riding a bicycle traveling at 15 mph may receive a different series of preprogrammed tours, lasting 5 to 10 minutes when approaching the same POI.

In another exemplary embodiment, the length of the preprogrammed tours may be varied, for example, by the size and area of the POI. For example, points-of-interest such as a battlefield may be large in area and require a traveler to travel several miles to traverse the POI and therefore be receptive to a longer tour selection. In an example where the POI is a small historical building, a user traveling along a route near the POI may quickly reach the site and move past it. In such an example, a shorter tour may be selected to conform to the user's time in proximity to the POI.

In another example, where a user in a vehicle accepts a tour but continues driving, an embodiment of the invention, upon detecting continued movement, may select from a plurality of preprogrammed tours, one that is shorter and omits distracting displays such as video. Such a selection may enhance the safety of the driver by serving to reduce distractions to that driver. In an exemplary embodiment of the invention, a user may select an option within the system to designate the user as a passenger. In such an embodiment, where the user is a passenger, the system may present preprogrammed tour material that otherwise may be distracting to a driver while in motion.

In order to optimize the tour information communicated to a user, an exemplary embodiment of the invention may request the user to designate their mode of travel when the system is initiated. Possible modes of travel may include, but are not limited to, vehicle (driver), vehicle (passenger), bicycle, on foot, or bus. Such a selection of a mode of travel may be received by the processor to better select from a plurality of preprogrammed tours.

Figure 5:
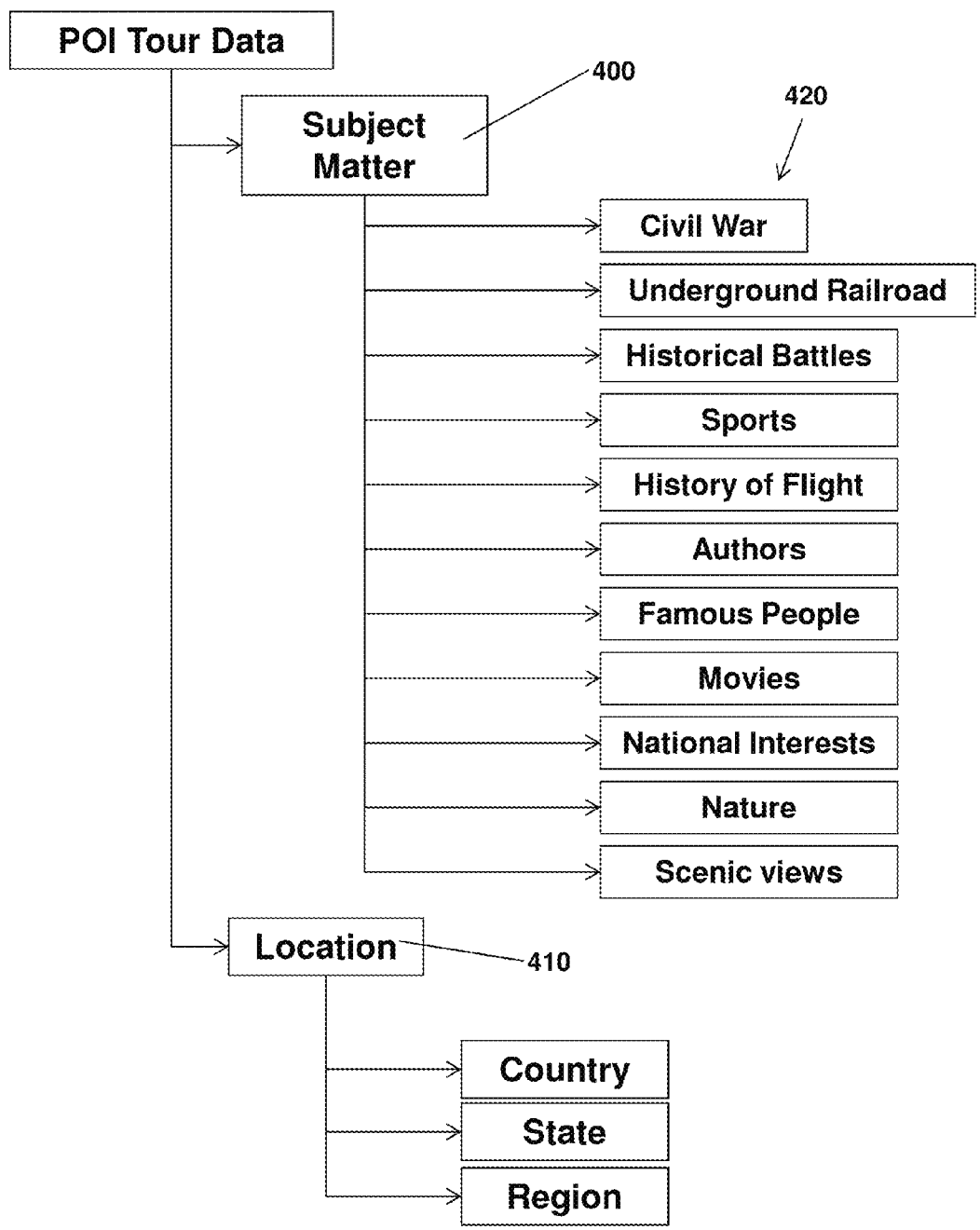
FIG. 5 is a diagram listing point-of-interest subject matter in an embodiment of the invention.

In order to accommodate the varied interests of a user of the invention, an embodiment of the invention may be configured to present to a user a menu or other user interface to allow that user to pre-configure such an embodiment to display only those POIs that are of interest to the user. A diagram illustrating examples of preprogrammed tours available is illustrated in FIG. 5. As is shown in FIG. 5, points-of-interest tour data may be selected and such selections received by an embodiment of the invention based on categories of subject matter 400 or location 410. Further point-of-interest sub-categories 420 may include, but are not limited to, civil war history, Underground Railroad, historical battles, sports, history of flight, famous authors, movie locations, national interests, nature, and scenic views. Other location sub-categories may include, but are not limited to, country, state, region and may comprise the subject matter categories for that location sub-category. An embodiment of the invention may be configured to allow a user to mark tours that have been previously presented such that they will not be displayed a second time or may be displayed as "grayed out" to indicate prior presentation.

Options for third party information pertaining to a POI, such as Wikipedia® articles as described earlier herein may be communicated to the user as that user approaches and is in the vicinity of the POI.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A computerized method for communicating tour information, comprising the steps of:
   receiving from a global positioning satellite system in communication with a mobile electronic device, geographic coordinates representing the location of the mobile electronic device;
   querying an electronic database in communication with the mobile device to determine whether the location of the mobile electronic device is within a predetermined distance from geographic coordinates stored on the database having associated with them a known point-of-interest;
   determining a user's movement characteristics, such characteristics comprising the user's mode of transportation;
   selecting from a plurality of tour data stored in the electronic database in communication with the mobile device, at least one preprogrammed tour in which the content of tour data is optimized to the user's movement characteristics and transportation mode related safety requirements, said preprogrammed tour further comprising turn-by-turn instructions guiding the user to a plurality of sub-locations associated with the point-of-interest within a predetermined distance of the mobile electronic device the distance being automatically determined based on a method of transportation in use by the user of the mobile electronic device and a speed of that user's travel; and
   communicating the tour data of the at least one tour to the user of the mobile electronic device through a user interface.

2. The method of claim 1, with the additional step of receiving a selection identifying one of the at least one preprogrammed tour for communication to the user.

3. The method of claim 1, with the additional steps of:
   receiving a selection representing one or more categories of user interest; and
   limiting the one or more preprogrammed tours selected to those belonging to the categories of interest selection received.

4. The method of claim 1, wherein the mobile electronic device is integrated into an automobile.

5. The method of claim 1, wherein the mobile electronic device is a mobile telephone.

6. The method of claim 1, wherein the electronic database is at least partially contained in a removable flash memory.

7. The method of claim 1, wherein determining the user's movement characteristics comprises the step of calculating the velocity of the mobile electronic device.

8. The method of claim 7, further comprising the step of communicating the tour data of the at least one tour to the user beginning at a distance from the point of interest that is variable depending upon the calculated velocity of the mobile electronic device.

9. The method of claim 7, further comprising the step of limiting the one or more preprogrammed tours selected to those optimized for the calculated velocity of the mobile electronic device.

10. The method of claim 1, further comprising the steps of:
    calculating the direction of travel of the mobile electronic device; and
    communicating the tour data of the at least one tour based on the calculated direction of travel.

11. The method of claim 1, further comprising the steps of:
    accessing a wireless communication transceiver;
    determining if internet service is available;
    querying the internet to identify materials associated with the received geographic coordinates; and
    receiving a least one of the identified materials.

12. The method of claim 1, comprising the step of:
    limiting the one or more preprogrammed tours selected to those optimized for the size and area of the point-of-interest.

13. A computerized system for communicating tour information to a user comprised of:
    an electronic database in electronic communication with a processor;
    a plurality of point of interest information contained within the electronic database;
    a plurality of preprogrammed tour data contained within the electronic database where such tours are associated with the plurality of point of interest information said tour data further comprising requirements related to a transportation mode in use;
    a user communication interface in electronic communication with the processor;
    wherein the processor executes software instructions to:
    receive geographic location data from a global positioning system;
    identify those points-of-interest contained within the electronic database that are within a predetermined distance of the received geographic location data;
    determine a user's movement characteristics, such characteristics comprising the user's mode of transportation;
    select at least one preprogrammed tour associated with the identified point-of-interest in which the amount of tour data is optimized to the user's movement characteristics and requirements related to the user's transportation mode, said preprogrammed tour further comprising turn-by-turn instructions guiding the user to a plurality of sub-locations associated with the point-of-interest within a predetermined distance of the mobile electronic device, the distance being automatically determined based on a method of transportation in use by the user of the mobile electronic device and a speed of that user's travel; and
    transmit the selected preprogrammed tour data to the user communication interface.

14. The system of claim 13, wherein the computerized system comprises a global positioning system receiver integrated within the mobile electronic device.

15. The system of claim 13, wherein the processor executes additional software instructions to:

receive data representing one or more categories of point of interest; and filtering the selected at least one preprogrammed tour data to limit the data to such tour data as corresponds to the received categories.

16. The system of claim 13, wherein the processor executes additional software instructions to:

receive data representing a mode of transportation; and filter the selected at least one preprogrammed tour data to limit the data to such tour data that is optimized for the received mode of transportation, such filtration comprising limiting tour instructions to avoid instructing the user to perform actions that are unsafe to those in the vicinity of the user.

17. The system of claim 13, wherein the processor executes additional software instructions to receive data representing the velocity of a mobile electronic device of which the processor is a component.

18. The system of claim 17, wherein the processor executes additional software instructions to begin transmitting the selected preprogrammed tour data to the user communication interface when the mobile electronic device is a certain distance away from the point of interest with which the preprogrammed tour data is associated, where the certain distance varies in accordance to the received velocity data.

19. The system of claim 17, wherein the processor executes additional software instructions to filter filtering selected at least one preprogrammed tour data to limit the data to such tour data that is optimized for the received velocity data.

20. A method for communicating tour information, comprising:

receiving from a global positioning satellite (GPS) system in communication with a mobile electronic device, geographic coordinates of the mobile electronic device;

querying the mobile electronic device's database to determine whether the position of the mobile electronic device is within a predetermined distance from geographic coordinates associated with a known point-of-interest stored on the database;

determining a user's mode of transportation and transportation mode related safety requirements;

selecting from a plurality of tour data stored in the mobile device's database, at least one preprogrammed tour corresponding to the point-of-interest within a predetermined distance of the mobile electronic device said preprogrammed tour comprising turn-by-turn instructions guiding the user to a plurality of sub-locations, the predetermined distance being automatically determined based on a method of transportation in use by the user of the mobile electronic device;

calculating the velocity of the mobile electronic device;

filtering the selected at least one preprogrammed tour to limit such at least one tour to those tours that are optimized for the calculated velocity; and notifying a user of the mobile electronic device that tour data is available for the point of interest where such notification takes place at a distance from the point of interest that is variable depending upon the calculated velocity;

receiving input from a user of the mobile electronic device to either accept or deny available tour data for the point of interest;

accessing the mobile electronic device's wireless transceiver to determine if there is an internet connection and querying the internet for materials linked to the geographic coordinates having associated with it the known point of interest if the internet connection exists; and communicating the tour data, transportation mode related safety requirements, and internet material to the user of the mobile electronic device through a user interface.

* * * * *